3,055,727
TREATMENT OF WOOL WITH HALOKETONES IN THE PRESENCE OF DIMETHYLFORMAMIDE
Nathan H. Koenig, Berkeley, Calif., assignor to the United States of America as represented by the Secretary of Agriculture
No Drawing. Filed Jan. 11, 1961, Ser. No. 82,138
5 Claims. (Cl. 8—128)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the modification of wool by reacting it with haloketones, particularly those wherein the halogen atom is attached to a carbon atom adjacent to the carbonyl group. More particularly, the invention concerns and has as its primary object the provision of novel processes wherein the reaction of wool with such haloketones is conducted in the presence of N,N-dimethylformamide (hereinafter termed dimethylformamide) whereby to facilitate and promote the said reaction. Further objects and advantages of the invention will be apparent from the following description wherein parts and percentages are by weight unless otherwise specified.

Prior to this invention it has been advocated that wool be modified by applying a haloketone to the wool followed by baking the treated wool in an oven. In another technique, the wool is heated with a solution of a haloketone in an organic solvent such as benzene or carbon tetrachloride. Under these conditions only a minor amount of the haloketone actually reacts with the wool so that the degree of modification is low.

In accordance with the present invention, wool is reacted with a haloketone in the presence of dimethylformamide. The latter compound catalyzes the actual chemical combination of the wool and the haloketone reactant. As a consequence, one is enabled to readily prepare wools containing substantial proportions of combined haloketone with correspondingly improved properties. Prior hereto, pyridine has been employed as a promoter in reacting haloketones with compounds containing active hydrogen atoms, i.e., primary amines, alcohols, phenols, etc. It has now been established that dimethylformamide is at least as active as pyridine in catalyzing reaction between wool and haloketones. Moreover, dimethylformamide is cheaper than pyridine and has a mild odor in contrast to the offensive odor of pyridine. Also, dimethylformamide involves a lesser toxicity problem than pyridine and less fire hazard because of a lower order of vapor pressure. Further, the high boiling point of dimethylformamide (153° C.) makes it possible to conduct the wool-haloketone reaction at higher temperatures without requiring pressure-tight vessels or other special apparatus. All of these items indicate that dimethylformamide is a very useful catalyst for the reaction in question and one which involves many advantages over agents previously described.

The unusual and effective action of dimethylformamide as a catalyst rather than a mere solvent is demonstrated by the following experimental data: Dry wool flannel (1.2 g.), α,p-dibromoacetophenone (1 g.), and dimethylformamide (10 ml.) were heated for one-half hour at 105° C. The wool was extracted with acetone and ethanol to remove unreacted reagents and dried. It was found that the increase in weight of the wool, due to reaction with the haloketone, was 21%. A series of experiments were then carried out under the same conditions but substituting for the dimethylformamide the same volume of the following solvents: Butyl acetate, chlorobenzene, and xylene. In these runs, the increase in weight of the wool was only 1 to 2%.

Carrying out the process of the invention essentially involves contacting wool with a haloketone in the presence of dimethylformamide. The reaction conditions such as proportion of reagents, specific haloketone used, time, temperature, etc., are not critical but may be varied to suit individual circumstances without changing the basic nature of the invention. The proportion of dimethylformamide may be varied widely and may be as low as 0.2 volume per volume of haloketone. In the case of haloketones which are normally solid, the volume considered is that of the molten (liquefied) compound. Usually, it is preferred to use a larger proportion of dimethylformamide, i.e., about 1 to 5 volumes thereof per volume of haloketone, to attain an increased catalytic effect. The temperature of reaction may be about from 25° to 130° C. The reaction rate is increased with increasing temperature and a preferred temperature range to expedite the reaction without possibility of damage to the wool is 100–120° C. The effect of temperature on the rate of reaction is illustrated by the following: In a series of runs, α,p-dibromoacetophenone (1 g.) was reacted with dry wool flannel (1.2 g.) in the presence of dimethylformamide (10 ml.) under varying conditions of time and temperature. Uptakes of haloketone obtained under these conditions were as follows:

| Reaction conditions: | Uptake of haloketone on wool, percent |
|---|---|
| 25° C.—3 days | 17 |
| 60° C.—30 minutes | 12 |
| 60° C.—60 minutes | 19 |
| 105° C.—20 minutes | 20 |

Conventional inert solvents such as xylene, chlorobenzene, or butyl acetate may be added to the reaction system. The use of a solvent is especially indicated where the haloketone used is a solid and the proportion of dimethylformamide is not sufficient to dissolve the haloketone. It is preferred to carry out the reaction under anhydrous conditions, thereby to ensure reaction between the wool and the haloketone but the reaction can also be applied to wool in its normal undried condition (containing about 12–14% water). The degree of modification of the wool is related to the proportion of haloketone taken up by the fiber, that is, the higher the uptake of haloketone the greater will be the modification of the wool. In general, the uptake of haloketone may be varied about from 1 to 25% by weight. In conducting the reaction, the haloketone is generally employed in excess over the amount desired to be taken up by the fiber. The time of reaction will vary depending on the proportion of dimethylformamide, temperature of reaction, reactivity of the haloketone selected, and the degree of modification desired. In general, the reaction may take anywhere from a few minutes to several hours.

The process in accordance with the invention may be carried out in various ways. For example, the wool may be directly contacted with the dimethylformamide and haloketone reactant and the reaction mixture preferably heated as indicated above to cause the haloketone to react with the wool. In the alternative, the wool may be pretreated with dimethylformamide and the haloketone then added to the mixture and the reaction carried out as previously described. The pretreatment may be carried out at normal temperature or with application of heat, i.e., at 25–130° C.

After reaction of the wool with the haloketone, the chemically modified wool is preferably treated to remove excess haloketone, reaction byproducts, dimethylformamide, and solvent, if such is used. Thus, the wool may be treated as by wringing, passage through squeeze-rolls, centrifugation, or the like, to remove the excess materials. In place of such mechanical action, or following it, the product may be extracted with an inert volatile solvent such as trichloroethylene, benzene, acetone, carbon tetrachloride, alcohol, etc. Successive extractions with different solvents may be used to ensure complete removal of all unreacted materials. The treated wool is then dried in the usual way.

By treating wool with a haloketone as herein described, the wool is chemically modified because there is a chemical reaction between the haloketone and the protein molecules of the wool fibers. As a result, the modified wool exhibits advantageous properties over normal wool, as explained below.

The modified wool is more resistant to oxidizing conditions. Such conditions may be encountered in textile mills during bleaching, shrinkproofing, or other finishing processess. Oxidizing environments also occur in use by the action of light and air, and in laundering by bleaching chemicals. The increased resistance to oxidizing conditions has been shown by exposing normal and modified wool samples to solutions of sodium hypochlorite, which is used in commercial bleaches.

The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the modified wool indicate beyond question that actual chemical combination between the wool and the haloketone has taken place, it is not known for certain how the wool and haloketone moieties are joined. It is believed, however, that the haloketone reacts with some of the sites on the wool molecule where there are reactive hydrogen atoms, e.g., amino, guanidino, and thiol groups. It may be, however, that other reactions occur and we do not intend to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be of all-wool composition or blends of wool with other textile fibers such as cotton, regenerated cellulose, viscose, animal hair, etc.

The invention may be applied in the reaction of wool with any ketone which contains a halogen atom in alpha position with respect to the carbonyl group. Such compounds may accurately be designated as α-haloketones. The halogen atom may be chlorine, bromine, or iodine. The important aspect of this structure is that the halogen group is activated by its proximity to the carbonyl group and it is thus available for reaction with reactive sites on the wool molecules. Particularly preferred are the aliphatic, aromatic, and aromatic-aliphatic α-haloketones. In addition to the basic ketone structure with the halogen in alpha position, the compounds may contain other substituents such as halogen (chlorine, bromine, iodine, or fluorine), ether groups, ester groups, nitro groups, etc. Examples of compounds coming into the purview of the invention are listed below by way of illustration and not limitation: Chloroacetone, bromoaceton, iodoacetone, 1-chloro-2-butanone, 1-bromo-2-butanone, 1-iodo-2-butanone, 1-chloro-2-hexanone, 1-bromo-2-hexanone, 1-iodo-2-hexanone, 1-chloro-2-octanone, 1-bromo-2-octanone, 1-chloro-2-decanone, 1-bromo-2-decanone, 1-chloro-2-hexadecanone, 1-bromo-2-hexadecanone, 3-chloro-2-butanone, 3-bromo-2-butanone, 3-chloro-2-pentanone, 3-bromo-2-pentanone, tertiary butyl chloromethyl ketone, 2-ethylhexyl α-chloroethyl ketone, 1-chloro-3-methoxy-2-propanone, 1,1-dichloro-2-propanone, 1,3-dichloro-2-propanone, 1,3-dibromo-2-propanone, 1,3-diiodo-2-propanone, 1,4-dichloro-2-butanone, 1,4-dibromo-2-butanone, chloromethyl cyclohexyl ketone, α-chloroethyl cyclohexyl ketone, chloromethyl 4-chlorocyclohexyl ketone, α-chloroacetophenone, α-bromoacetophenone, α-iodoacetophenone, chloromethyl p-tolyl ketone, bromomethyl p-tolyl ketone, iodomethyl p-tolyl ketone, chloromethyl m-tolyl ketone, chloromethyl o-tolyl ketone, chloromethyl naphthyl ketone, chloromethyl 3,4-dimethylphenyl ketone, α-chloropropiophenone, α-bromopropiophenone, α-iodopropiophenone, chloromethyl biphenyl ketone, chloromethyl benzyl ketone, bromomethyl benzyl ketone, methyl α-chlorobenzyl ketone, ethyl α-bromobenzyl ketone, α,α-dichloroacetophenone, α,p-dichloroacetophenone, α,p - dibromoacetophenone, α-chloro-p-nitroacetophenone, α-chloro-p-methoxyacetophenone, phenyl α-chlorobenzyl ketone, 4-bromophenyl α-bromobenzyl ketone, α-chloro-p-phenylacetophenone, etc.

The invention is further demonstrated by the following illustrative examples. The structures of the various haloketones referred to in the examples are given below:

α,β-Dibromoacetophenone

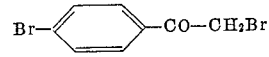

α-Chloro-p-phenylacetophenone

α-Bromoacetophenone

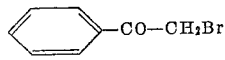

1,3-dichloro-2-propanone $$ClCH_2-CO-CH_2Cl$$

*Example I*

Two 4-gram samples of dried wool flannel were each heated with a mixture of 1 gram of α,p-dibromoacetophenone and 25 ml. of dimethylformamide at 105° C. for times indicated below.

The two samples of treated wool were washed with warm acetone, then extracted with ethanol for 16 hours in a Soxhlet apparatus to remove unreacted reagents. The extracted wool was then dried for 2 hours in an oven at 105° C. Weighings were than made to determine the uptake of haloketone by the wool. The following results were obtained.

| Time of reaction, min.: | Uptake of haloketone, percent |
| --- | --- |
| 30 | 15 |
| 90 | 18 |

*Example II*

A 1.2-gram sample of undried wool flannel, containing about 12% moisture, was heated with 10 ml. of dimethylformamide and 1 gram of α,p-dibromoacetophenone for 60 minutes at 105° C. The treated wool was extracted as in Example I. The uptake of haloketone, based on the final dry weight and a calculated initial dry weight, was 22%.

*Example III*

A mixture of 2 ml. dimethylformamide, 1 gram α,p-dibromoacetophenone, and 5 ml. chlorobenzene was added to 1.2 grams of dry wool flannel. The reaction system was heated at 105° C. for 30 minutes. The treated wool was extracted as in Example I. The uptake of haloketone was 22%.

*Example IV*

A mixture of 2 ml. dimethylformamide, 1 gram α,p-dibromoacetophenone and 3 ml. xylene was added to 1.2 grams of dry wool flannel. The reaction system was heated at 105° C. for 30 minutes. The treated wool was extracted as in Example I. The uptake of haloketone was 24%.

*Example V*

Three samples of dried wool flannel (1.2 grams each) were each heated with a mixture of 1 gram of α-chloro-p-phenylacetophenone and 10 ml. dimethylformamide at 105° C. for times as indicated in the table below. The treated wool samples were extracted as in Example I. The following results were obtained.

Time of reaction, min.:    Uptake of haloketone, percent
- 30 ---------------------------------------- 10
- 60 ---------------------------------------- 14
- 120 --------------------------------------- 16

*Example VI*

Three 1.2-gram samples of dried wool flannel were each heated with 10 ml. of dimethylformamide and 3 grams of α-chloro-p-phenylacetophenone at 105° C. for the times indicated below. The treated samples were extracted as in Example I. The following results were obtained:

Time of reaction, min.:    Uptake of haloketone, percent
- 30 ---------------------------------------- 14
- 60 ---------------------------------------- 16
- 90 ---------------------------------------- 17

*Example VII*

Dry wool flannel (1.2 g.) was heated with dimethylformamide (10 ml.) and α-bromoacetophenone (0.3 ml.) for 30 minutes at 105° C. The treated wool was extracted as in Example I. The uptake of haloketone was 14%.

*Example VIII*

Dry wool flannel (1.2 g.) was heated with dimethylformamide (5 ml.) and 1,3-dichloro-2-propanone (0.5 g.) for 30 minutes at 105° C. The treated wool was extracted as described in Example I. The uptake of haloketone was 7%.

*Example IX*

Experiments were carried out to determine the resistance of the modified wool samples to the action of aqueous sodium hypochlorite, which is commonly used in bleaches.

Samples of treated and untreated wool weighing approximately 0.026 gram each were placed individually in a beaker containing 20 ml. of 1.8% aqueous sodium hypochlorite solution. The solution was stirred thoroughly with a mechanical stirrer and the time required to disintegrate the sample was noted. The results are tabulated below:

| Haloketone | Uptake of haloketone on wool, percent | Time to disintegrate fabric, min. |
|---|---|---|
| None (untreated wool) | 0 | 6 |
| α,p-Dibromoacetophenone | 21 | 22 |
| α-Chloro-p-phenylacetophenone | 14 | 25 |
| Do | 16 | 29 |
| α-Bromoacetophenone | 15 | 27 |

*Example X*

To determine shrinkage properties, measured fabric samples were milled at 1700 r.p.m. for 2 minutes at 40–42° C. in an "Accelerotor" with 0.5% sodium oleate solution, using a liquor-to-wool ratio of 50 to 1. After this laundering operation, the samples were remeasured to determine their area shrinkage. The improvement in shrinkage properties of the wool modified in accordance with the invention is illustrated by the following data:

| Haloketone | Uptake of haloketone on wool, percent | Area shrinkage, percent |
|---|---|---|
| None (untreated wool) | 0 | 56 |
| α,p-Dibromoacetophenone | 20 | 23 |
| α-Chloro-p-phenylacetophenone | 15 | 24 |

Having thus defined the invention, what is claimed is:

1. A process for chemically modifying wool which comprises reacting wool in the presence of dimethylformamide at a temperature about from 25 to 130° C. with an α-haloketone wherein the halogen is selected from the group consisting of chlorine, bromine, and iodine.
2. The process of claim 1 wherein the α-haloketone is α,p-dibromoacetophenone.
3. The process of claim 1 wherein the α-haloketone is α-chloro-p-phenylacetophenone.
4. The process of claim 1 wherein the α-haloketone is α-bromoacetophenone.
5. The process of claim 1 wherein the α-haloketone is 1,3-dichloro-2-propanone.

References Cited in the file of this patent

UNITED STATES PATENTS

| | | |
|---|---|---|
| 2,171,241 | Johnson | Aug. 29, 1939 |
| 2,367,273 | Hall et al. | Jan. 16, 1945 |
| 2,418,071 | Harris et al. | Mar. 25, 1947 |
| 2,974,003 | Koenig | Mar. 7, 1961 |